Figure 1:
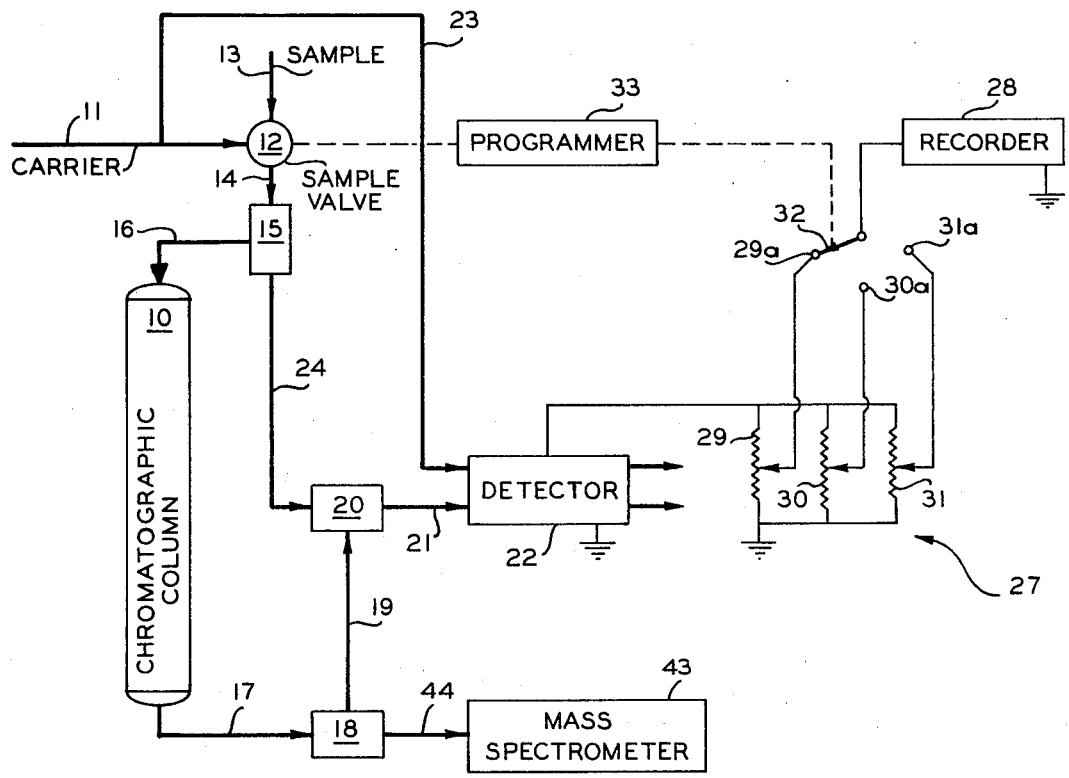

United States Patent

Favre

[15] 3,686,923
[45] Aug. 29, 1972

[54] TOTAL SAMPLE INDICATOR FOR CHROMATOGRAPHY

[72] Inventor: John A. Favre, Bartlesville, Okla.
[73] Assignee: Phillips Petroleum Company
[22] Filed: Dec. 16, 1969
[21] Appl. No.: 885,508

[52] U.S. Cl. ............... 73/23.1, 23/232 C, 23/254 E
[51] Int. Cl. .............................................. G01n 31/08
[58] Field of Search .................. 73/23, 23.1; 23/232

[56] References Cited

UNITED STATES PATENTS

| | | | |
|---|---|---|---|
| 2,875,606 | 9/1959 | Robinson | 73/23.1 |
| 2,995,410 | 8/1961 | McDonell | 73/23.1 X |
| 3,097,518 | 7/1963 | Taylor | 73/23.1 X |
| 3,126,731 | 9/1964 | Armstrong | 73/23.1 |
| 3,177,138 | 4/1965 | Larrison | 73/23.1 X |
| 3,291,980 | 12/1966 | Coates | 73/23.1 X |

OTHER PUBLICATIONS

" Investigation of the Linearity of a Stream Splitter for Capillary Gas Chromatography," L. S. Ettre and Warren Averill, Analytical Chemistry, Vol. 33, No. 6, May, 1961, pp. 680–684.

Primary Examiner—Richard C. Queisser
Assistant Examiner—C. E. Snee, III
Attorney—Young and Quigg

[57] ABSTRACT

In a chromatographic analyzer, the carrier fluid stream is split at a point downstream from the sample injection. A first portion of the stream is passed through the chromatographic column in a conventional manner. The second portion of the stream is passed directly to the detector to provide an indication of the amount of sample injected.

10 Claims, 3 Drawing Figures

PATENTED AUG 29 1972 3,686,923

INVENTOR.
J. A. FAVRE

BY Young & Quigg

ATTORNEYS

TOTAL SAMPLE INDICATOR FOR CHROMATOGRAPHY

Chromatographic analyzers have been developed in recent years which are capable of analyzing various types of fluid mixtures. It is customary to inject a sample of the material to be analyzed into a stream of carrier fluid before the carrier fluid is introduced into the separation column. Various types of rotary and diaphragm operated sample valves have been developed for this purpose. In some operations, the sample is introduced manually by use of a hypodermic syringe. It is customary to employ one or more signal attenuators between the detector and the recorder so that the recorded peaks will be of convenient height for measurement. If the composition of the sample should change appreciably, it may be necessary to adjust the attenuators to maintain the desired amplitudes. In plant operations, it is also desirable to know if the sampling system is operating in a satisfactory manner.

In accordance with this invention, a system is provided for checking the operation of the sampling system in a chromatographic analyzer and for providing an indication of the amount and general composition of the sample introduced. This is accomplished by dividing the carrier fluid stream at a point downstream from the sample injection into first and second streams. The first stream is directed through the chromatographic column to the detector in a conventional manner. The second stream is passed directly to the detector so as to provide an indication of the quantity and general composition of the injected sample. The initial output signal from the detector, which is thus representative of the total sample injected, can be employed to determine proper settings of the attenuators for subsequent recording of the individual peaks.

Figure 2:
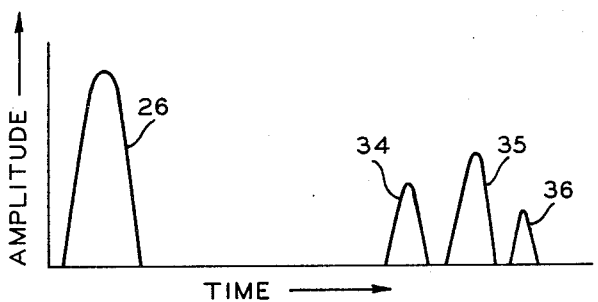
Figure 3:
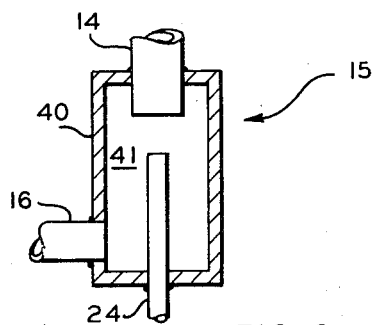

In the accompanying drawing, FIG. 1 is a schematic representation of a chromatographic analyzer having the sample indicator of this invention incorporated therein. FIG. 2 is a graphical representation of the output signal from the detector of FIG. 1. FIG. 3 illustrates one of the stream splitting and/or mixing devices employed in the apparatus of FIG. 1.

Referring now to the drawing in detail and to FIG. 1 in particular, there is shown a chromatographic column 10 which contains any suitable packing material that selectively retards passage of the constituents of a fluid sample to be analyzed. Carrier fluid is introduced through a conduit 11 which communicates with the first inlet of a sample injection device, such as a sample valve 12. A sample of the fluid mixture to be analyzed is introduced into valve 12 through a conduit 13. The effluent from sample valve 12 is passed through a conduit 14 to the first inlet of a stream splitter 15. A first outlet stream from splitter 15 is passed through a conduit 16 to the inlet of column 10. The effluent from column 10 is directed through a conduit 17 to a second stream splitter 18. An outlet stream from splitter 18 is passed through a conduit 19 to a mixing device 20, and from there through a conduit 21 to the first inlet of a detector 22. A portion of the carrier fluid passed to the second inlet of detector 22 through a conduit 23.

With the exception of the stream splitters and mixers, the apparatus thus far described constitutes a conventional chromatographic analyzer. Detector 22 provides an output signal which is representative of the difference in composition of the two streams passed therethrough. When carrier fluid alone is passed through both channels of the detector, the output signal is zero. When constituents of the sample appear in the column effluent, an output signal is provided by the detector. Detector 22 can advantageously be an instrument which provides an output electrical signal representative of this difference in composition. Instruments employing thermistors to compare thermal conductivities of the fluid streams and instruments employing ionization detectors are examples of known detectors which can be employed for this purpose.

In accordance with this invention, a second outlet stream from splitter 15 is directed through a conduit 24 to the second inlet of mixer 20, and from there through conduit 21 to detector 22. A portion of the effluent stream from sample valve 12 is thus passed to detector 22 prior to the appearance of any of the sample constituents in the effluent from column 10. This results in detector 22 providing an initial output signal which is representative of the composition of the total sample introduced into the analyzer. As illustrated in FIG. 2, an initial peak 26 appears in the detector output signal which is representative of the total sample.

The output signal from detector 22 is applied through a suitable attenuation network 27 to a recorder 28. As illustrated, network 27 can comprise a series of potentiometers 29, 30 and 31 which are connected in parallel. The contactors of these potentiometers are connected to respective output terminals 29a, 30a and 31a. A switch 32 selectively engages these terminals to apply an attenuated signal from the detector to recorder 28.

Sample valve 12 and switch 32 can be controlled by a programmer 33 which operates the valve and the switch in timed sequence. Valve 12 is actuated at the start of the analysis cycle to introduce a sample into the carrier fluid stream. Switch 32 can be moved to engage terminals 29a, 30a and 31a in any desired sequence to provide the desired degree of attenuation for each of the output peaks, such as 34, 35 and 36, which represent the individual constituents of the sample. The magnitude of peak 26 provides the operator with information concerning the desired degree of attenuation to be employed for the individual peaks in order that the recorder may remain on scale and still provide signals of suitable amplitude for detection. The presence of peak 26 also provides visual indication of proper operation of the sampling devices.

A suitable stream splitter 15 for use in the apparatus of FIG. 1 is illustrated in FIG. 3. This stream splitter comprises a housing 40 which provides an interior chamber 41. Conduit 14 enters the first end of housing 40, and conduit 24 extends into the second end of the housing in axial alignment with conduit 14. Conduit 16 is attached to the side wall of the housing. As illustrated, conduit 24 advantageously has a cross sectional area substantially less than that of conduit 14 so that the inlet stream is effectively divided between conduits 16 and 24. The relative sizes of the three conduits serve to control the degree of division of the inlet stream. Mixer 20 of FIG. 1 can have substantially the same configuration as splitter 15. In this case, conduits 19, 21 and 24 correspond to respective conduits 16, 14 and 24 which are connected to splitter 15.

In accordance with another embodiment of this invention, a portion of the effluent stream from column 10 can be passed to a mass spectrometer 43 to provide a detailed analysis of the column effluent. To this end, stream splitter 18 serves to divide the effluent stream from the column and pass a portion thereof through conduit 44 to the mass spectrometer. Stream splitter 18 can have the same configuration as stream splitter 15.

While this invention has been described in conjunction with preferred embodiments it should be evident that it is not limited thereto.

What is claimed is:

1. Analysis apparatus comprising:
   a chromatographic column having an inlet and an outlet;
   a detector adapted to provide an output signal representative of the composition of a fluid stream introduced therein;
   a fluid stream splitter comprising a housing defining an interior chamber and having first, second and third ports communicating with the chamber;
   first conduit means communicating with said first port to introduce a carrier fluid;
   sample injection means communicating with said first conduit means to introduce a sample of material to be analyzed into said first conduit means;
   second conduit means communicating between said second port and the inlet of said chromatographic column;
   third conduit means communicating between the outlet of said chromatographic column and the inlet of said detector; and
   fourth conduit means communicating between said third port and said inlet of said detector.

2. The apparatus of claim 1 wherein said sample injection means comprises a sample valve.

3. The apparatus of claim 1, further comprising a recorder, means connecting said detector to said recorder to apply the output signal from said detector to said recorder, and at least one signal attenuating means included in said means connecting said detector to said recorder.

4. The apparatus of claim 3, further comprising at least one additional signal attenuating means, and means to connect said attenuating means selectively in said means connecting said detector to said recorder.

5. The apparatus of claim 1, further comprising a mass spectrometer, and conduit means communicating with said third conduit means to direct a portion of fluid passing through said third conduit means to said mass spectrometer.

6. The method of analysis which comprises:
   introducing a sample of material to be analyzed into a carrier fluid stream;
   dividing the resulting carrier fluid and sample into first and second streams;
   passing the first stream directly to the inlet of a detector which is capable of establishing an output signal that is representative of the composition of material passed thereto; and
   passing the second stream through a chromatographic column and then to said inlet of said detector.

7. The method of claim 6, further comprising passing a portion of said second stream, after passage through the chromatographic column, to a mass spectrometer.

8. The apparatus of claim 1 wherein said detector has first and second inlets to receive fluid streams and provides an output signal which is representative of a difference between the compositions of two fluid streams passed to the respective first and second inlets thereof, said third conduit means communicates with said first inlet, said fourth conduit means communicates with said first inlet; and further comprising fifth conduit means communicating between said first conduit means and said second inlet to pass carrier fluid to said second inlet.

9. The apparatus of claim 8 wherein said detector comprises ionization detectors.

10. The method of claim 6 wherein the first stream is passed to the first inlet of a differential detector having first and second inlets, said second stream is passed to said first inlet; and further comprising passing a portion of said carrier fluid to said second inlet.

* * * * *